(12) United States Patent
Kim

(10) Patent No.: US 10,077,076 B2
(45) Date of Patent: Sep. 18, 2018

(54) PANEL ASSEMBLY STRUCTURE FOR PREVENTING COLUMN DIVE

(71) Applicant: Hyundai Motor Company, Seoul (KR)

(72) Inventor: Hye-Yeon Kim, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 15/289,709

(22) Filed: Oct. 10, 2016

(65) Prior Publication Data

US 2017/0217494 A1   Aug. 3, 2017

(30) Foreign Application Priority Data

Jan. 29, 2016  (KR) .................... 10-2016-0011218

(51) Int. Cl.
  *B62D 25/14*    (2006.01)
  *B62D 21/15*    (2006.01)
  *B62D 25/20*    (2006.01)

(52) U.S. Cl.
  CPC ............. *B62D 21/15* (2013.01); *B62D 25/14* (2013.01); *B62D 25/2018* (2013.01)

(58) Field of Classification Search
  CPC ......... B62D 25/20; B62D 21/15; B62D 25/14
  USPC ........................................ 296/187.08, 193.07
  See application file for complete search history.

(56) References Cited

U.S. PATENT DOCUMENTS

| 4,671,536 | A | * | 6/1987 | Yoshimura | ........... | B62D 25/145 |
| | | | | | | 280/779 |
| 4,682,788 | A | * | 7/1987 | Yoshimura | ........... | B62D 25/145 |
| | | | | | | 280/779 |
| 7,600,807 | B2 | * | 10/2009 | Bachmann | ............. | B62D 25/20 |
| | | | | | | 296/187.08 |
| 9,776,671 | B2 | * | 10/2017 | Song | ..................... | B62D 25/145 |
| 2010/0320801 | A1 | * | 12/2010 | Kitai | .................... | B62D 21/157 |
| | | | | | | 296/187.08 |
| 2014/0284965 | A1 | * | 9/2014 | Mildner | ................. | B62D 25/20 |
| | | | | | | 296/187.08 |
| 2014/0306485 | A1 | * | 10/2014 | Bechtler | .............. | B62D 29/008 |
| | | | | | | 296/187.08 |
| 2017/0001669 | A1 | * | 1/2017 | Ohigashi | .............. | B62D 25/088 |
| 2017/0158039 | A1 | * | 6/2017 | Nakamura | ............... | B60K 1/04 |

FOREIGN PATENT DOCUMENTS

| EP | 1467114 A1 | * | 10/2004 | ............. B62D 21/15 |
| JP | 2012-011828 A | | 1/2012 | |
| JP | 2013-136314 A | | 7/2013 | |
| JP | 2013-184569 A | | 9/2013 | |

(Continued)

*Primary Examiner* — Pinel E Romain
(74) *Attorney, Agent, or Firm* — Morgan, Lewis & Bockius LLP

(57) ABSTRACT

A panel assembly structure for preventing a column dive, which includes a center floor panel including a center floor tunnel curved upward in a longitudinal direction of a vehicle, and a dash panel having an inclined lower end to be fastened to the center floor panel and including a dash tunnel formed at the inclined lower end of the dash panel, the dash tunnel being curved upward in a longitudinal direction of the vehicle to be connected to the center floor tunnel, may include a center floor tunnel upper member mounted on an upper surface of the center floor tunnel and expanded bilaterally from the center floor tunnel on an upper surface of the center floor panel.

19 Claims, 13 Drawing Sheets

(56) References Cited

FOREIGN PATENT DOCUMENTS

| | | |
|---|---|---|
| JP | 2015-136988 A | 7/2015 |
| KR | 10-2010-0060286 A | 6/2010 |
| KR | 10-2014-0024602 A | 3/2014 |
| KR | 10-1499447 B1 | 3/2015 |

* cited by examiner

SECTION A-A

SECTION B-B

PANEL ASSEMBLY STRUCTURE FOR PREVENTING COLUMN DIVE

CROSS-REFERENCE TO RELATED APPLICATIONS

The present application claims priority to Korean Patent Application No. 10-2016-0011218, filed Jan. 29, 2016, the entire contents of which is incorporated herein for all purposes by this reference.

BACKGROUND OF THE INVENTION

Field of the Invention

Various embodiments of the present invention relate to a panel assembly structure for preventing a column dive, and, particularly, to a panel assembly structure capable of preventing a column dive by dispersing impact energy to prevent a dash tunnel and a center floor tunnel from being deformed when a vehicle collides head-on.

Description of Related Art

In recent years, a Transmission Gear Shift (TGS) mounting portion M tends to move upward when developing a vehicle platform. The TGS mounting portion M is a portion through which cables for connecting a transmission TM and a TGS lever pass, and serves to prevent shift noise increased as the TGS mounting portion M is relatively located at the bottom. For this reason, the angle of a dash tunnel 21 is increased compared to conventional ways, with the consequence that a column dive easily occurs when a vehicle collides head-on.

Hereinafter, a column dive will be described with reference to FIGS. 1 to 4. FIGS. 1 to 4 are views illustrating conventional problems. The column dive described in FIG. 1 is a phenomenon in which a steering wheel is pushed downward from an original position when a vehicle collides head-on.

In more detail, i) a transmission TM comes into contact with a gear box G by impact energy which is generated and transferred to an engine room when the vehicle collides head-on (steps 1) and 2)). Thereinafter, ii) a first steering shaft ST1 lifts a universal joint U while rotating counterclockwise, and thus a second steering shaft ST2 is pushed downward (steps 3) and 5)). At the same time, iii) the front portion of a center floor tunnel 11 is deformed, and thus a cowl crossbar support CS, which is bolted to the center floor tunnel 11 at one point, is pulled downward (steps 4) and 6)). Therefore, iv) the column dive in which the steering wheel is pushed downward occurs. Since it is difficult to detect an airbag when such a column dive occurs, this may have a bad consequence on driver's safety.

The cause of the column dive will be described in more detail. As illustrated in FIGS. 2 and 3, the related art prevents the deformation of a dash tunnel 21 by mounting a dash upper member 40 on the upper surface of a dash panel 20 in the transverse direction of the vehicle, and mounting a dash tunnel reinforcement 22 on the upper surface of the dash tunnel 21. However, the lower end of the dash tunnel reinforcement 22 comes into direct contact with the center floor tunnel 11.

In addition, dash lower members D are conventionally mounted in a separated state, as illustrated in FIG. 4. Accordingly, when the vehicle collides head-on, the impact transferred along front side members FS is transferred rearward through front side rear lower members FR and the dash lower members D, and is simultaneously dispersed to the left and right of the vehicle through rear lower member fronts F, rear lower member rears R, and sub-frame mounting brackets SB. However, since the dash lower members D are separated from each other, a reinforcement structure that surrounds both upper and lower surfaces of the dash panel 20 and the center floor panel 10 is cut only at a separated portion.

Accordingly, in the conventional panel assembly structure, deformation easily occurs in the contact portion between the lower end of the dash tunnel reinforcement 22 and the center floor tunnel 11 when the vehicle collides head-on. For this reason, the column dive easily occurs since the cowl crossbar support CS is pulled downward.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a panel assembly structure capable of preventing a column dive by a reinforcement structure configured to surround both upper and lower surfaces of a connection portion between a dash tunnel and a center floor tunnel.

According to various aspects of the present invention, a panel assembly structure for preventing a column dive, which includes a center floor panel including a center floor tunnel curved upward in a longitudinal direction of a vehicle, and a dash panel having an inclined lower end to be fastened to the center floor panel and including a dash tunnel formed at the inclined lower end of the dash panel, the dash tunnel being curved upward in the longitudinal direction of the vehicle to be connected to the center floor tunnel, may include a center floor tunnel upper member mounted on an upper surface of the center floor tunnel and expanded bilaterally from the center floor tunnel on an upper surface of the center floor panel.

The panel assembly structure may further include a dash tunnel reinforcement mounted on an upper surface of the dash tunnel and an upper surface of the center floor tunnel upper member.

The panel assembly structure may further include a dash tunnel lower member mounted on inside surfaces of the center floor tunnel and the dash tunnel.

The panel assembly structure may further include a dash upper member formed in a transverse direction of the vehicle and mounted on an upper surface of the lower end of the dash panel.

The center floor tunnel upper member may include a first upper surface portion mounted on the upper surface of the center floor tunnel.

The center floor tunnel upper member may further include first outside surface portions formed at a left and right of the first upper surface portion and mounted on an outside surface of the center floor tunnel.

The center floor tunnel upper member may further include expansion portions formed at the left and right of the respective first outside surface portions and expanded bilaterally from the center floor tunnel.

The center floor tunnel upper member may further include a first curved portion curved upward from the first upper surface portion in a transverse direction of the vehicle.

The first curved portion may include a plurality of first curved portions arranged parallel to each other.

A lower end portion of a dash tunnel reinforcement may be mounted on an upper surface of a foremost one of the first curved portions.

Lower ends of cowl crossbar supports may be fastened to left and right surfaces of the first curved portions.

The dash tunnel reinforcement may include a second upper surface portion mounted on the upper surface of the dash tunnel.

The dash tunnel reinforcement may further include second outside surface portions formed at a left and right of the second upper surface portion and mounted on an outside surface of the dash tunnel.

The second upper surface portion may include a lower end portion mounted on an upper surface of a foremost one of a plurality of first curved portions.

The second upper surface portion may further include protrusion portions curved upward in the longitudinal direction of the vehicle at the respective left and right of the second upper surface portion.

The second upper surface portion may further include a contact portion connected to the protrusion portions and the lower end portion and directly mounted on the upper surface of the dash tunnel.

The dash tunnel lower member may include a mounting portion mounted on the inside surfaces of the dash tunnel and the center floor tunnel.

The dash tunnel lower member may further include second curved portions disposed on both side surfaces of the mounting portion and curved downward in the longitudinal direction of the vehicle.

Ends of sub-frame mounting brackets may be mounted on lower surfaces of the second curved portions.

A second upper surface portion of the dash tunnel reinforcement may be mounted on an upper surface of the dash upper member.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 5:
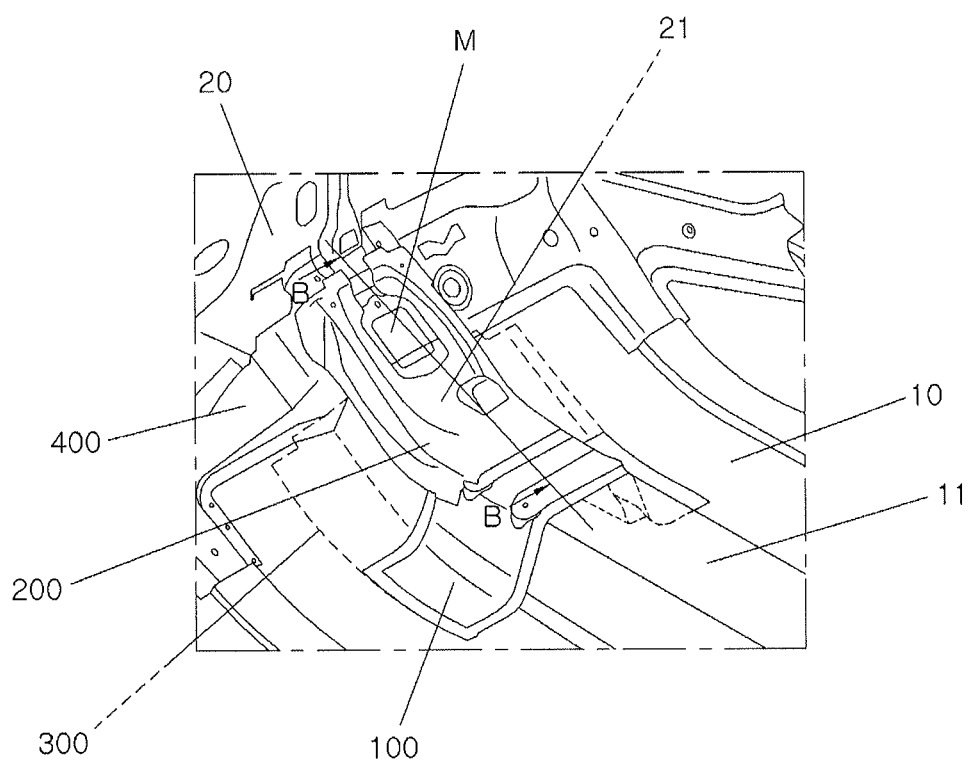
FIG. 5 is a perspective view illustrating a panel assembly structure for preventing a column dive according to various embodiments of the present invention.
Figure 6:
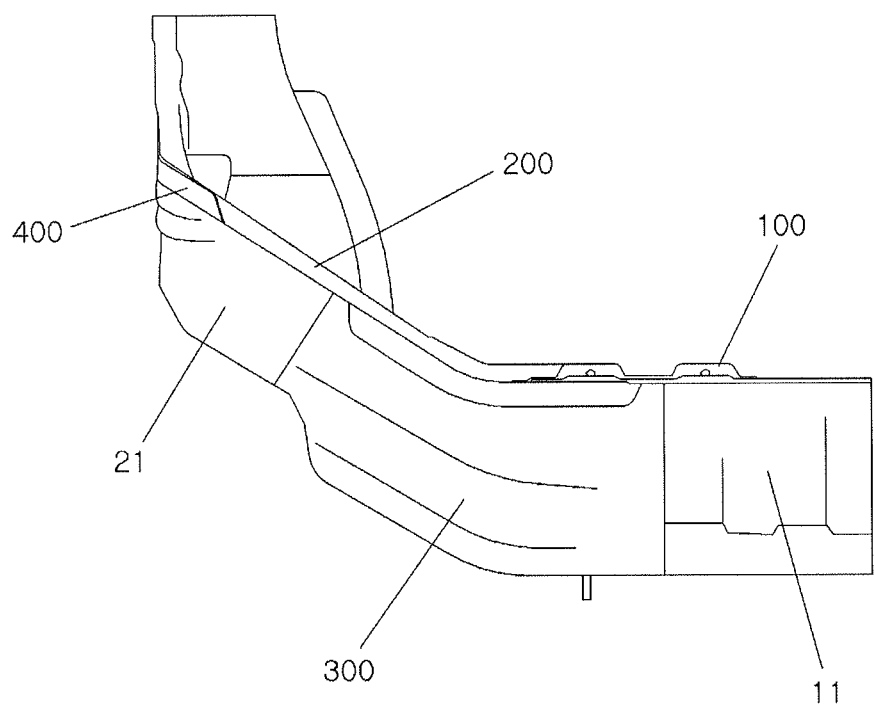
FIG. 6 is a cross-sectional view taken along line B-B of FIG. 5.

FIG. 5 is a perspective view illustrating a panel assembly structure for preventing a column dive according to various embodiments of the present invention. FIG. 6 is a cross-sectional view taken along line B-B of FIG. 5. Referring to FIGS. 5 and 6, the panel assembly structure for preventing a column dive according to various embodiments of the present invention includes a center floor panel 10, a dash panel 20, a center floor tunnel upper member 100, a dash tunnel reinforce 200, a dash tunnel lower member 300, and a dash upper member 400.

The center floor panel 10 includes a center floor tunnel 11 curved upward in the longitudinal direction of a vehicle. In addition, the dash panel 20 has an inclined lower end so as to be fastened to the center floor panel 10, and includes a dash tunnel 21 formed at the lower end thereof. The dash tunnel 21 is curved upward in the longitudinal direction of the vehicle to be connected to the center floor tunnel 11.

The center floor tunnel upper member 100 is mounted on the upper surface of the center floor tunnel 11. In addition, the center floor tunnel upper member 100 is expanded bilaterally from the center floor tunnel 11 on the upper surface of the center floor panel 10.

The dash tunnel reinforcement 200 is mounted on the upper surface of the dash tunnel 21 and the upper surface of the center floor tunnel upper member 100. The dash tunnel lower member 300 is mounted on the inside surfaces of the center floor tunnel 11 and the dash tunnel 21.

In addition, the dash upper member 400 is formed in the transverse direction of the vehicle and is mounted on the upper surface of the lower end of the dash panel 20. A second upper surface portion 210 of the dash tunnel reinforcement 200, which will be described later, may be mounted on the upper surface of the dash upper member 400. That is, the dash upper member 400 is mounted on the upper surface of the lower end of the dash panel 20, and the second upper surface portion 210 of the dash tunnel reinforcement 200 for reinforcing the dash tunnel 21 is mounted on the upper surface of the dash upper member 400.

The dash upper member 400 serves to disperse impact energy, which is transferred to the dash panel 20 when the vehicle collides head-on, in the transverse direction of the vehicle. In addition, the dash upper member 400 serves to transfer impact energy in the longitudinal direction of the vehicle to the dash tunnel reinforcement 200, so as to disperse the impact energy through the center floor tunnel upper member 100, the dash tunnel reinforcement 200, and the dash tunnel lower member 300.

Hereinafter, the center floor tunnel upper member 100, the dash tunnel reinforcement 200, the dash tunnel lower member 300, and the dash upper member 400, which are reinforcement structures for preventing the deformation of the center floor tunnel 11 and the dash tunnel 21, will be described in detail.

Figure 7:
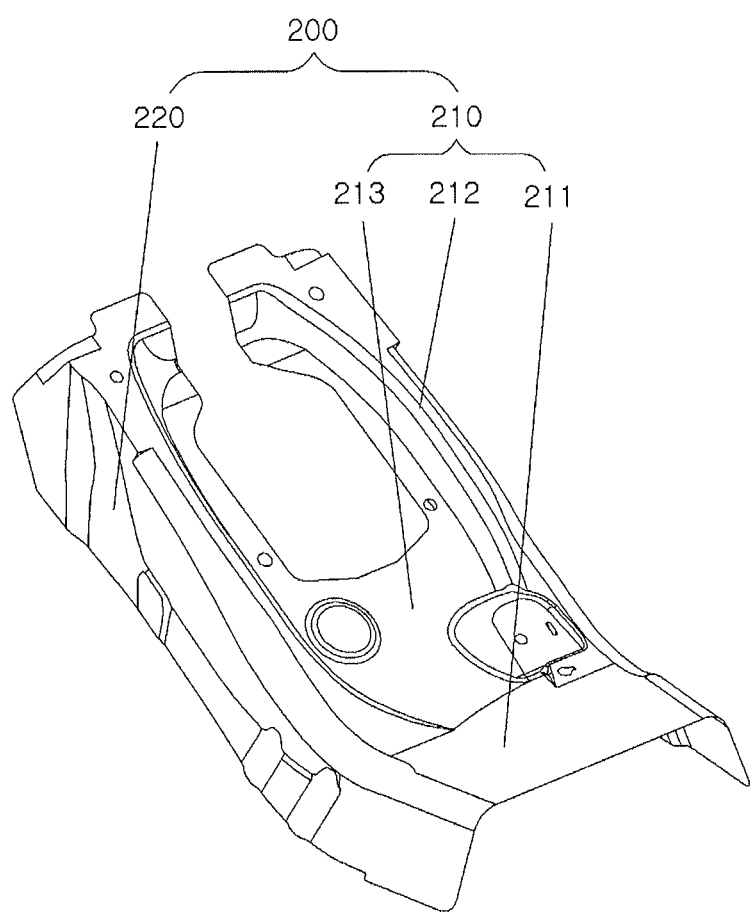
FIG. 7 is a perspective view illustrating a center floor tunnel upper member according to various embodiments of the present invention.
Figure 12:
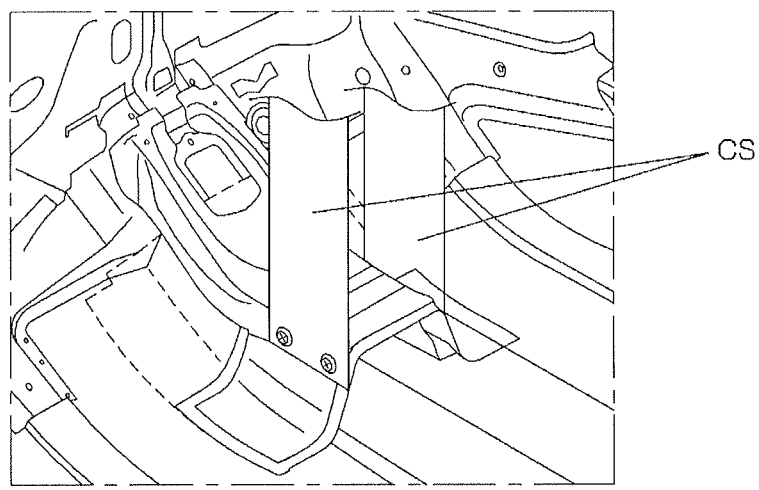
FIG. 12 is a view illustrating the mounted state of cowl crossbar supports according to various embodiments of the present invention.

FIG. 7 is a perspective view illustrating the center floor tunnel upper member in various embodiments of the present invention. FIG. 12 is a view illustrating the mounted state of cowl crossbar supports in various embodiments of the present invention. Referring to FIGS. to 12, the center floor tunnel upper member 100 includes a first upper surface portion 110, first outside surface portions 120, expansion portions 130, and a first curved portion 140.

The first upper surface portion 110 is mounted on the upper surface of the center floor tunnel 11. The first outside surface portions 120 are formed at the left and right of the first upper surface portion 110, and are mounted on the exterior surface of the center floor tunnel 11.

The expansion portions 130 are formed at the left and right of the respective first outside surface portions 120, and are expanded bilaterally from the center floor tunnel 11. The first curved portion 140 is formed in the transverse direction of the vehicle while being curved upward from the first upper surface portion 110.

In this case, the first curved portion 140 may include a plurality of first curved portions arranged in parallel to each other. In addition, a lower end portion 211 of the dash tunnel reinforcement 200, which will be described later, may be mounted on the upper surface of the foremost one of the first curved portions 140. Thus, it is possible to increase a contact area so as to sufficiently support impact energy transferred to the dash tunnel reinforcement 200 when the vehicle collides head-on. That is, the center floor tunnel upper member 100 serves to disperse the impact energy through the first curved portion 140 (see FIG. 12).

In more detail, impact energy, in the transverse direction of the vehicle, transferred to the dash tunnel reinforcement 200 is transferred to the first curved portion 140 of the center floor tunnel upper member 100, and is then dispersed in the transverse direction of the vehicle through the first upper surface portion 110, the first outside surface portions 120, and the expansion portions 130. At the same time, the impact energy may be transferred to the dash tunnel lower member 300 to be dispersed downward of the vehicle.

Thus, it is possible to prevent a column dive due to the deformation of the center floor tunnel 11 by dispersing a load (see FIG. 3) concentrated on the conventional deformed portion, i.e. the front portion of the center floor tunnel 11.

In addition, the first curved portion 140 may include a plurality of first curved portions arranged in parallel to each other, and the lower ends of cowl crossbar supports CS may be respectively fastened to the left and right surfaces of the first curved portions 140 (see FIG. 12). That is, the cowl crossbar supports CS are fastened to the left and right surfaces of the first curved portions 140 of the center floor tunnel upper member 100 by a plurality of bolts.

Thus, the cowl crossbar supports CS are not directly bolted to the center floor tunnel 11 at one point. Therefore, impact energy due to head-on collision is not concentrated on the front portion of the center floor tunnel 11 (i.e., on the bolting portions between the center floor tunnel and the cowl crossbar supports), unlike the related art. That is, impact energy is dispersed to a plurality of bolting portions on the left and right surfaces of the first curved portions 140.

In addition, the impact energy transferred to the bolting portions is not directly transferred to the center floor tunnel 11, and is dispersed in the transverse direction of the vehicle through the first upper surface portion 110, the first outside surface portions 120, and the expansion portions 130.

Consequently, it is possible to prevent the column dive due to the deformation of the center floor tunnel 11 by dispersing the load (see FIG. 3) concentrated on the conventional deformed portion, i.e. the front portion of the center floor tunnel 11 (i.e., on the bolting portions between the center floor tunnel and the cowl crossbar supports).

Figure 8:
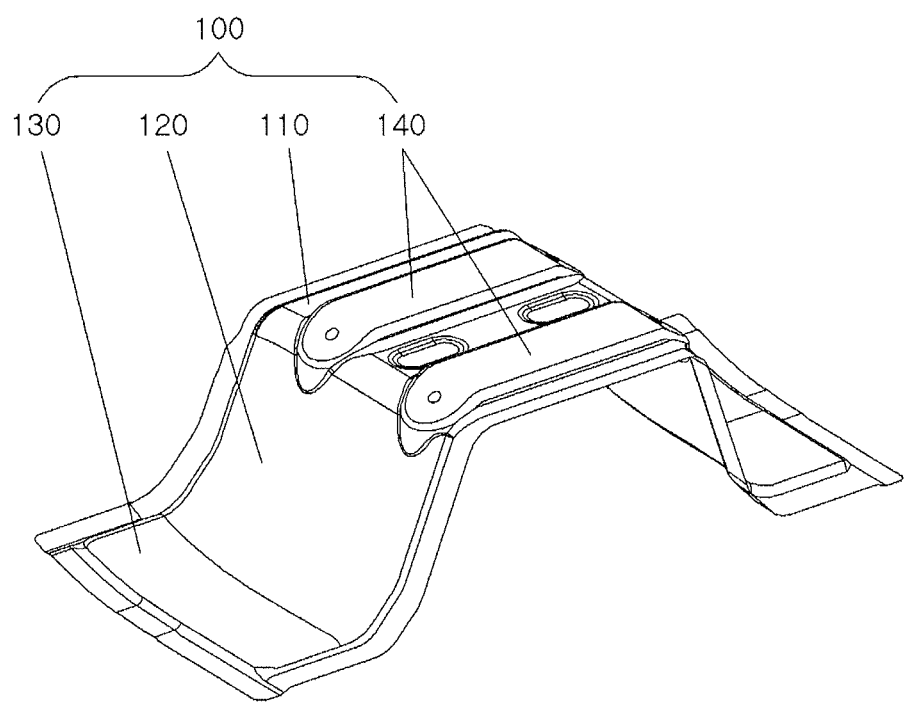
FIG. 8 is a perspective view illustrating a dash tunnel reinforce according to various embodiments of the present invention.

FIG. 8 is a perspective view illustrating the dash tunnel reinforce in various embodiments of the present invention. Referring to FIG. 8, the dash tunnel reinforcement 200 includes a second upper surface portion 210 and second outside surface portions 220.

The second upper surface portion 210 is mounted on the upper surface of the dash tunnel 21. The second outside surface portions 220 are formed at the left and right of the second upper surface portion 210, and are mounted on the outside surface of the dash tunnel 21.

In addition, the second upper surface portion 210 includes a lower end portion 211, protrusion portions 212, and a contact portion 213. In this case, the lower end portion 211 is directly mounted on the upper surface of the foremost one of the first curved portions 140. The protrusion portions 212 are formed in the longitudinal direction of the vehicle at the respective left and right of the second upper surface portion 210 while being curved upward. In addition, the contact portion 213 is connected to the protrusion portions 212 and the lower end portion 211, and is directly mounted on the upper surface of the dash tunnel 21.

Accordingly, when impact energy due to head-on collision is transferred from the dash panel 20 to the dash tunnel reinforcement 200, the impact energy is transferred rearward of the vehicle along the protrusion portions 212. Then, the impact energy is transferred to the lower end portion 211 located at the rear of the protrusion portions 212, and is then transferred to the first curved portions 140 of the center floor tunnel upper member 100, particularly to a foremost one of the first curved portions 140.

Figure 1:
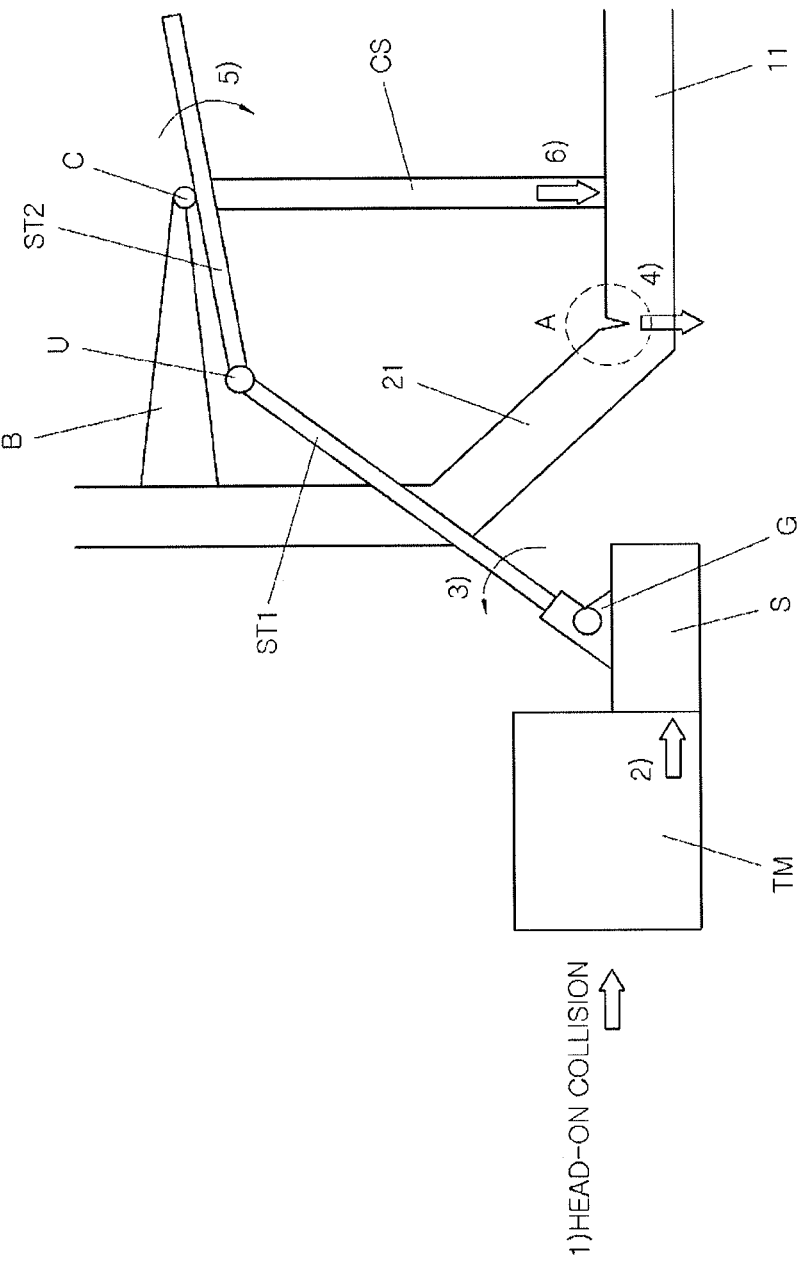
FIG. 1 is a view for explaining a column dive occurring in the related art.
Figure 2:
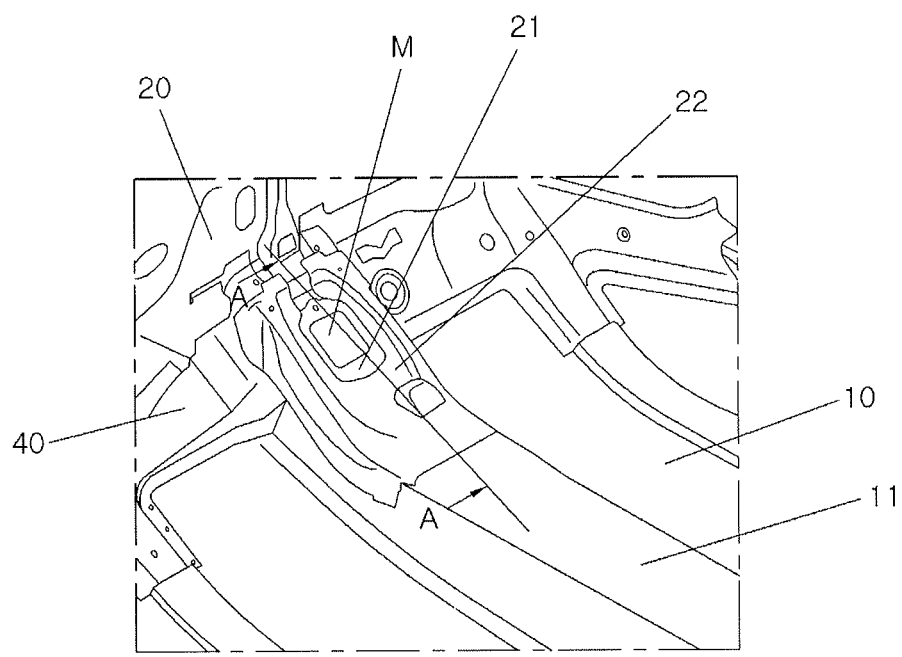
FIG. 2 is a perspective view illustrating a conventional panel assembly structure.
Figure 3:
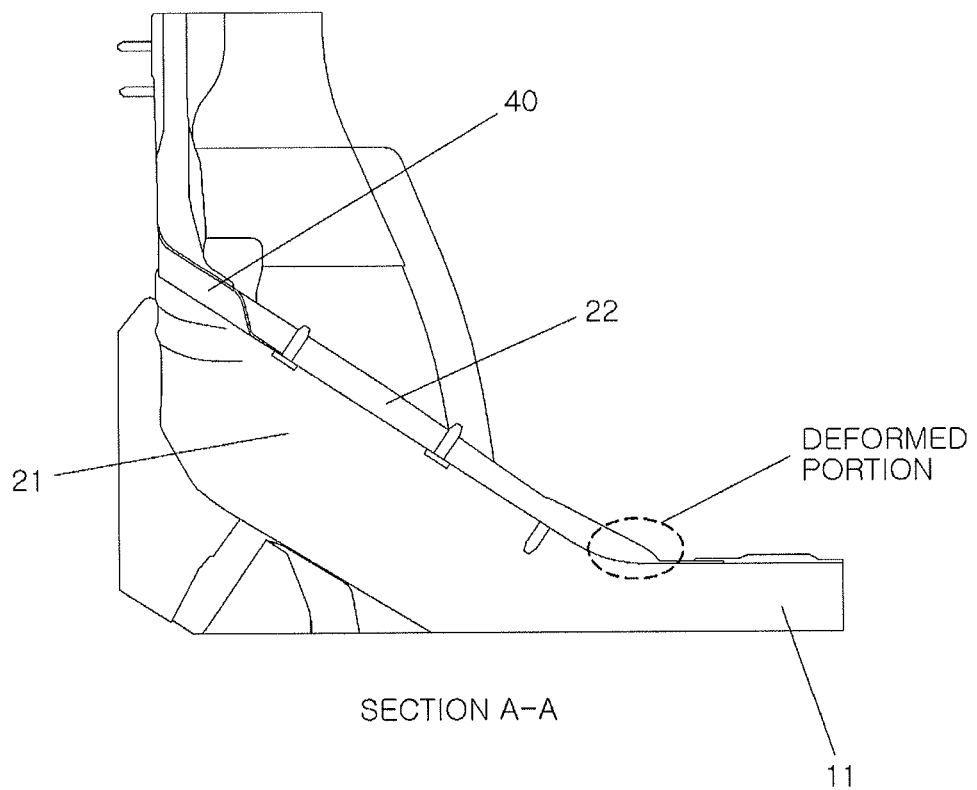
FIG. 3 is a cross-sectional view taken along line A-A of FIG. 2.
Figure 4:
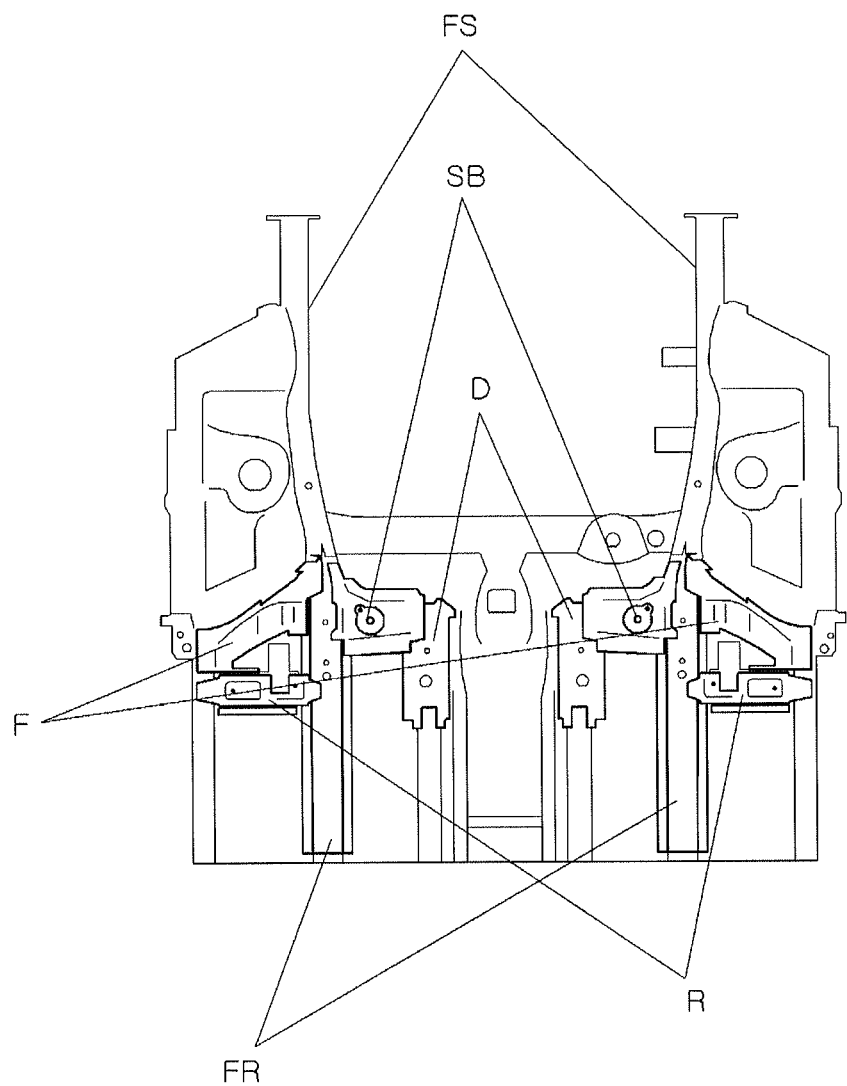
FIG. 4 is a bottom view illustrating the conventional panel assembly structure.

That is, in the related art, the dash tunnel reinforcement 22 comes into direct contact with the center floor tunnel 11, and the contact area is small (linear contact, see FIG. 3). However, in various embodiments of the present invention, the dash tunnel reinforcement 200 does not come into direct contact with the center floor tunnel 11, but comes into contact with the center floor tunnel 11 through the center floor tunnel upper member 100.

In addition, since the contact area between the dash tunnel reinforcement 200 and the center floor tunnel upper member 100 is increased (surface contact between the lower end portion and the first curved portion), it is possible to sufficiently support impact energy transferred to the dash tunnel reinforcement 200 when the vehicle collides head-on.

Therefore, it is possible to perfectly prevent the column dive due to the deformation of the center floor tunnel 11.

Figure 9:
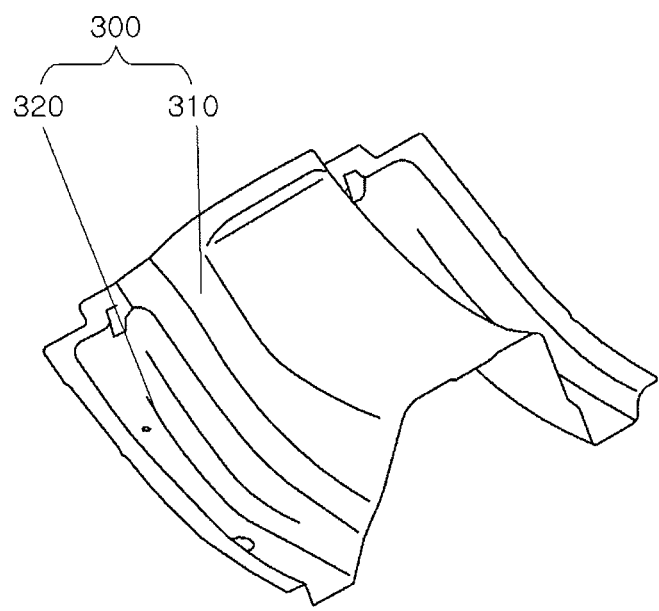
FIG. 9 is a perspective view illustrating a dash tunnel lower member according to various embodiments of the present invention.
Figure 10:
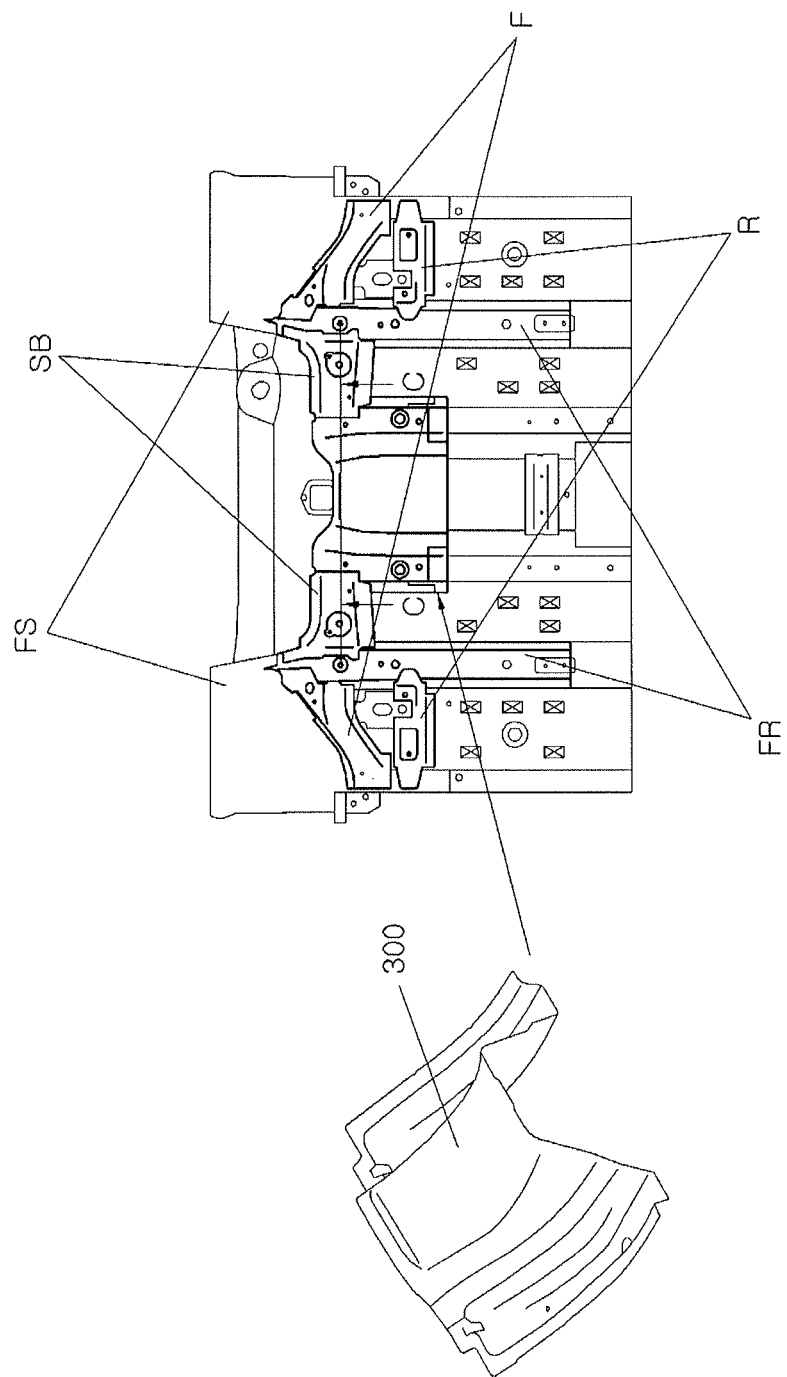
FIG. 10 is a view illustrating the mounted state of the dash tunnel lower member according to various embodiments of the present invention.
Figure 11:
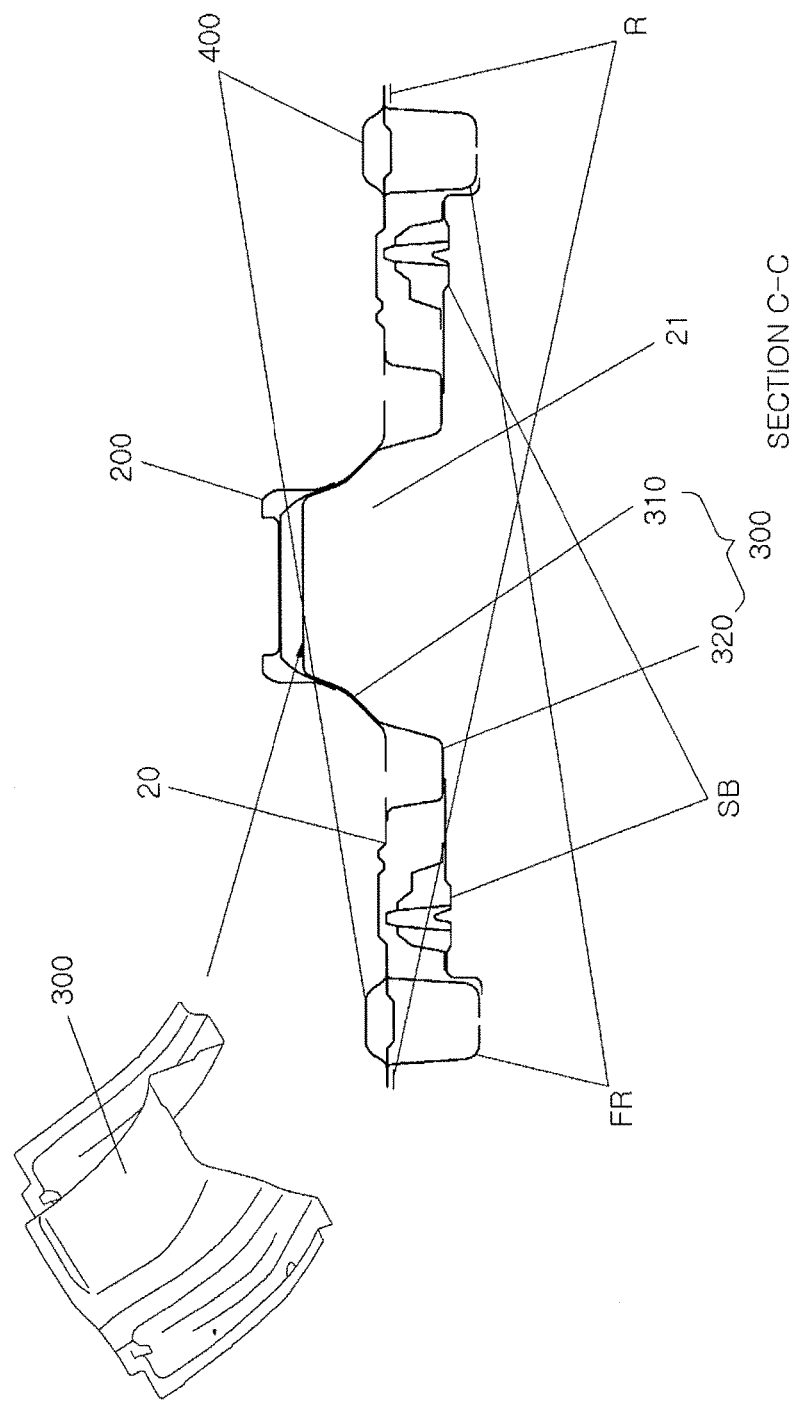
FIG. 11 is a cross-sectional view taken along line C-C of FIG. 10.

FIG. 9 is a perspective view illustrating the dash tunnel lower member according to various embodiments of the present invention. FIG. 10 is a view illustrating the mounted state of the dash tunnel lower member in various embodiments of the present invention. FIG. 11 is a cross-sectional view taken along line C-C of FIG. 10. Referring to FIGS. 9 to 11, the dash tunnel lower member 300 includes a mounting portion 310 and second curved portions 320.

The mounting portion 310 is mounted on the inside surfaces of the dash tunnel 21 and the center floor tunnel 11. In addition, the second curved portions 320 are disposed on both side surfaces of the mounting portion 310, and are curved downward in the longitudinal direction of the vehicle. In this case, the ends of sub-frame mounting brackets SB may be mounted on the lower surfaces of the second curved portions 320.

That is, since the dash lower members D are mounted in the state in which they are separated into left and right members in the related art, the reinforcement structure that surrounds both upper and lower surfaces of the connection portion between the dash tunnel 21 and the center floor tunnel 11 is cut at a separated portion. For this reason, when the vehicle collides head-on, impact energy may not be sufficiently dispersed in the transverse direction of the vehicle.

However, in the present invention, the mounting portion 310 is mounted on the inside surfaces of the dash tunnel 21 and the center floor tunnel 11, particularly to the connection portion between the dash tunnel 21 and the center floor tunnel 11, in order to form a reinforcement structure for surrounding both upper and lower surfaces of the connection portion between the dash tunnel 21 and the center floor tunnel 11. Therefore, it is possible to sufficiently support impact energy transferred when the vehicle collides head-on and to perfectly prevent the column dive due to the deformation of the center floor tunnel 11.

In the present invention, the ends of the sub-frame mounting brackets SB are mounted on the lower surfaces of the second curved portions 320 which are disposed on both side surfaces of the mounting portion 310 and are curved downward in the transverse direction of the vehicle. Consequently, impact energy transferred when the vehicle collides head-on is sufficiently dispersed in the transverse direction of the vehicle, thereby perfectly preventing the column dive due to the deformation of the center floor tunnel 11.

Figure 13:
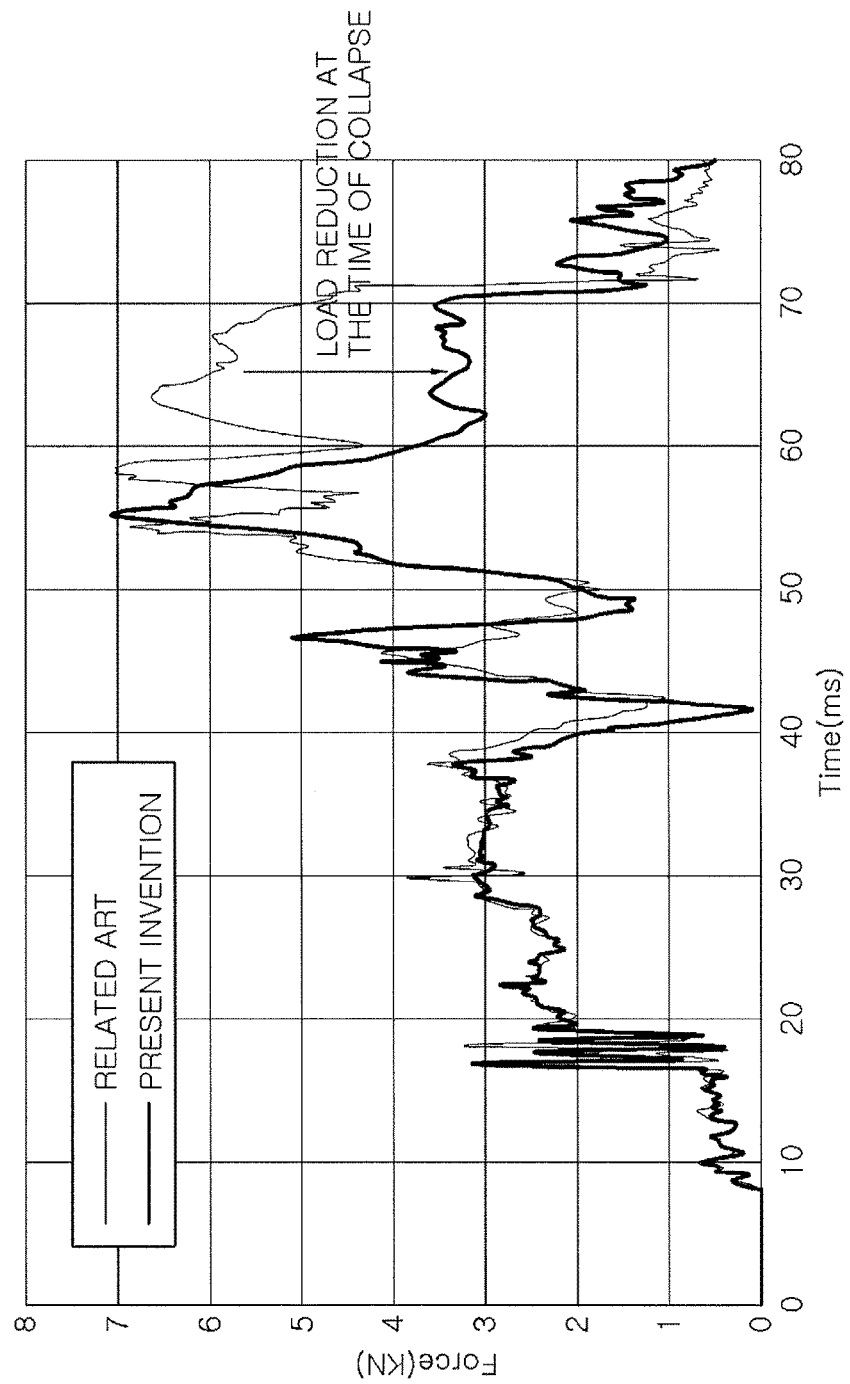
FIG. 13 is a graph for explaining the effect of the present invention.

FIG. 13 is a graph for explaining the effect of the present invention. As illustrated in FIG. 13, it can be seen that, at the time of collapse, i.e. at the time when a transmission TM comes into contact with a gear box G by impact energy transferred to an engine room when the vehicle collides head-on, and then a first steering shaft ST1 lifts a universal joint U while rotating counterclockwise, a load applied to the universal joint U in the conventional panel assembly structure is about 6 KN, and a load applied to the universal joint U in the panel assembly structure of the present invention is about 3 KN.

That is, since the column dive strongly occurs in the conventional panel assembly structure, a large load is applied upward to the universal joint U while the first steering shaft ST1 rotates counterclockwise. However, since a large deformation does not occur in the front portion of the center floor tunnel 11 in the panel assembly structure of the present invention, it can be seen that a small load is applied upward to the universal joint U.

That is, the column dive can be significantly alleviated in the panel assembly structure of the present invention, and thus it is possible to effectively protect driver's safety by accurately sensing an airbag.

In accordance with various embodiments of the present invention, it is possible to disperse impact energy when a vehicle collides head-on, by adding a dash tunnel lower member, which serves as a load path in horizontal and vertical directions, instead of a dash lower member as an exterior-side transverse member.

In addition, it is possible to prevent a column dive by dispersing impact energy to prevent a dash tunnel and a center floor tunnel from being deformed when the vehicle collides head-on.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A panel assembly structure for preventing a column dive, which includes a center floor panel including a center floor tunnel curved upward in a longitudinal direction of a vehicle, and a dash panel having an inclined lower end to be fastened to the center floor panel and including a dash tunnel formed at the inclined lower end of the dash panel, the dash tunnel being curved upward in the longitudinal direction of the vehicle to be connected to the center floor tunnel, the panel assembly structure comprising:
    a center floor tunnel upper member mounted on an upper surface of the center floor tunnel and expanded bilaterally from the center floor tunnel on an upper surface of the center floor panel; and
    a dash tunnel reinforcement mounted on an entire surface of an upper surface of the dash tunnel and a part of the upper surface of the center floor tunnel upper member.

2. The panel assembly structure of claim 1, further comprising a dash tunnel lower member mounted on inside surfaces of the center floor tunnel and the dash tunnel.

3. The panel assembly structure of claim 1, further comprising a dash upper member formed in a transverse direction of the vehicle and mounted on an upper surface of the lower end of the dash panel.

4. The panel assembly structure of claim 1, wherein the center floor tunnel upper member comprises a first upper surface portion mounted on the upper surface of the center floor tunnel.

5. The panel assembly structure of claim 4, wherein the center floor tunnel upper member further comprises first outside surface portions formed at a left and right of the first upper surface portion and mounted on an outside surface of the center floor tunnel.

6. The panel assembly structure of claim 5, wherein the center floor tunnel upper member further comprises expansion portions formed at the left and right of the respective first outside surface portions and expanded bilaterally from the center floor tunnel.

7. The panel assembly structure of claim 6, wherein the center floor tunnel upper member further comprises a first curved portion curved upward from the first upper surface portion in a transverse direction of the vehicle.

8. The panel assembly structure of claim 7, wherein the first curved portion comprises a plurality of first curved portions arranged parallel to each other.

9. The panel assembly structure of claim 8, wherein a lower end portion of the dash tunnel reinforcement is mounted on an upper surface of a foremost one of the first curved portions.

10. The panel assembly structure of claim 8, wherein lower ends of cowl crossbar supports are fastened to left and right surfaces of the first curved portions.

11. The panel assembly structure of claim 1, wherein the dash tunnel reinforcement comprises a second upper surface portion mounted on the upper surface of the dash tunnel.

12. The panel assembly structure of claim 11, wherein the dash tunnel reinforcement further comprises second outside surface portions formed at a left and right of the second upper surface portion and mounted on an outside surface of the dash tunnel.

13. The panel assembly structure of claim 11, wherein the second upper surface portion comprises a lower end portion mounted on an upper surface of a foremost one of a plurality of first curved portions.

14. The panel assembly structure of claim 13, wherein the second upper surface portion further comprises protrusion portions curved upward in the longitudinal direction of the vehicle at the respective left and right of the second upper surface portion.

15. The panel assembly structure of claim 14, wherein the second upper surface portion further comprises a contact portion connected to the protrusion portions and the lower end portion and directly mounted on the upper surface of the dash tunnel.

16. The panel assembly structure of claim 2, wherein the dash tunnel lower member comprises a mounting portion mounted on the inside surfaces of the dash tunnel and the center floor tunnel.

17. The panel assembly structure of claim 16, wherein the dash tunnel lower member further comprises second curved portions disposed on both side surfaces of the mounting portion and curved downward in the longitudinal direction of the vehicle.

18. The panel assembly structure of claim 17, wherein ends of sub-frame mounting brackets are mounted on lower surfaces of the second curved portions.

19. The panel assembly structure of claim 3, wherein a second upper surface portion of the dash tunnel reinforcement is mounted on an upper surface of the dash upper member.

* * * * *